Aug. 18, 1959
E. M. WHEELER
2,899,922
APPARATUS FOR FORMING RECEPTACLES
Filed Nov. 3, 1953
4 Sheets-Sheet 2
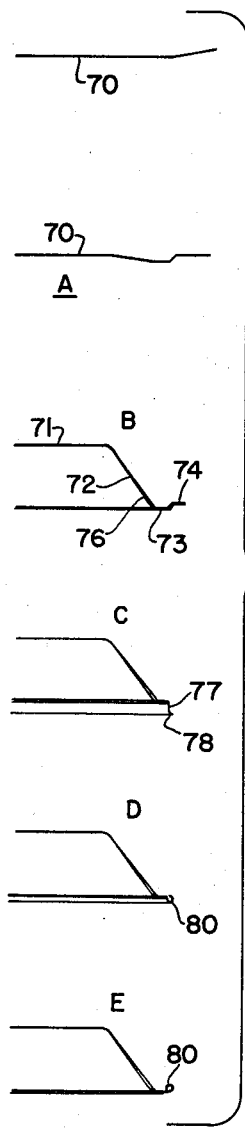
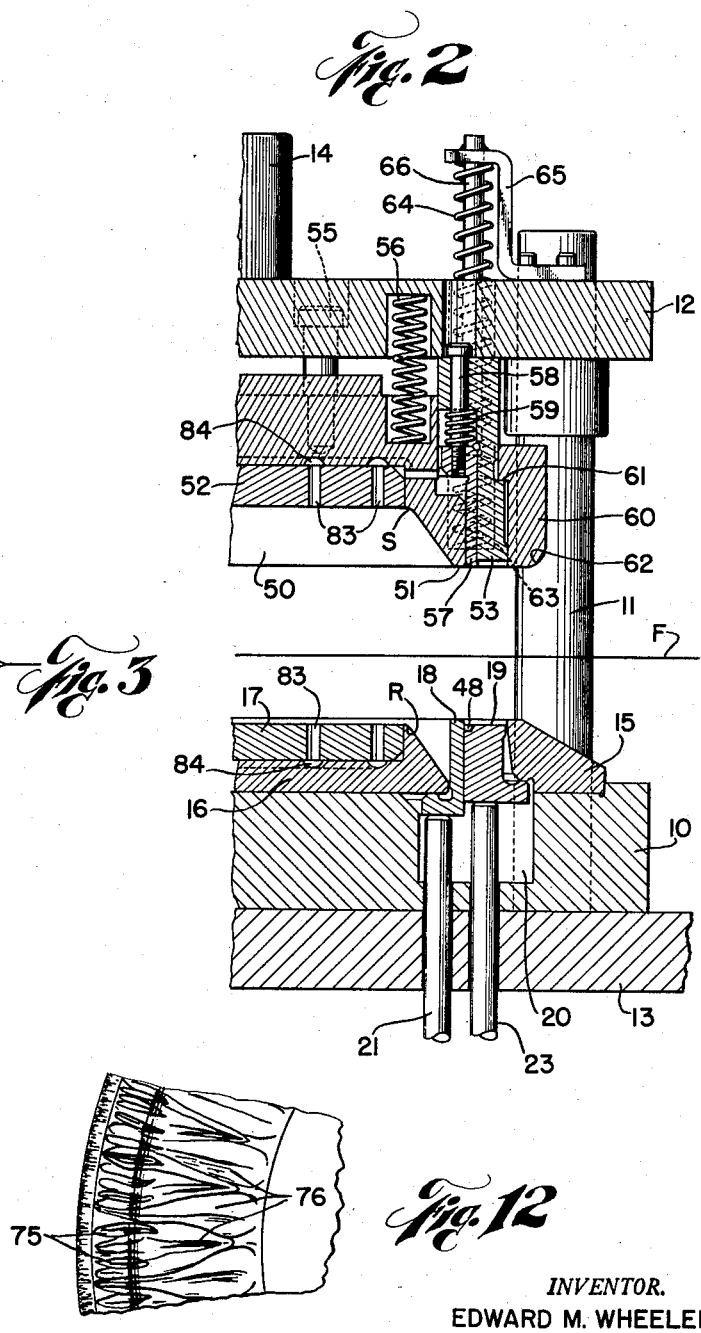
INVENTOR.
EDWARD M. WHEELER
BY
Howard B. Funk
ATTORNEY Aug. 18, 1959   E. M. WHEELER   2,899,922
APPARATUS FOR FORMING RECEPTACLES
Filed Nov. 3, 1953   4 Sheets-Sheet 3

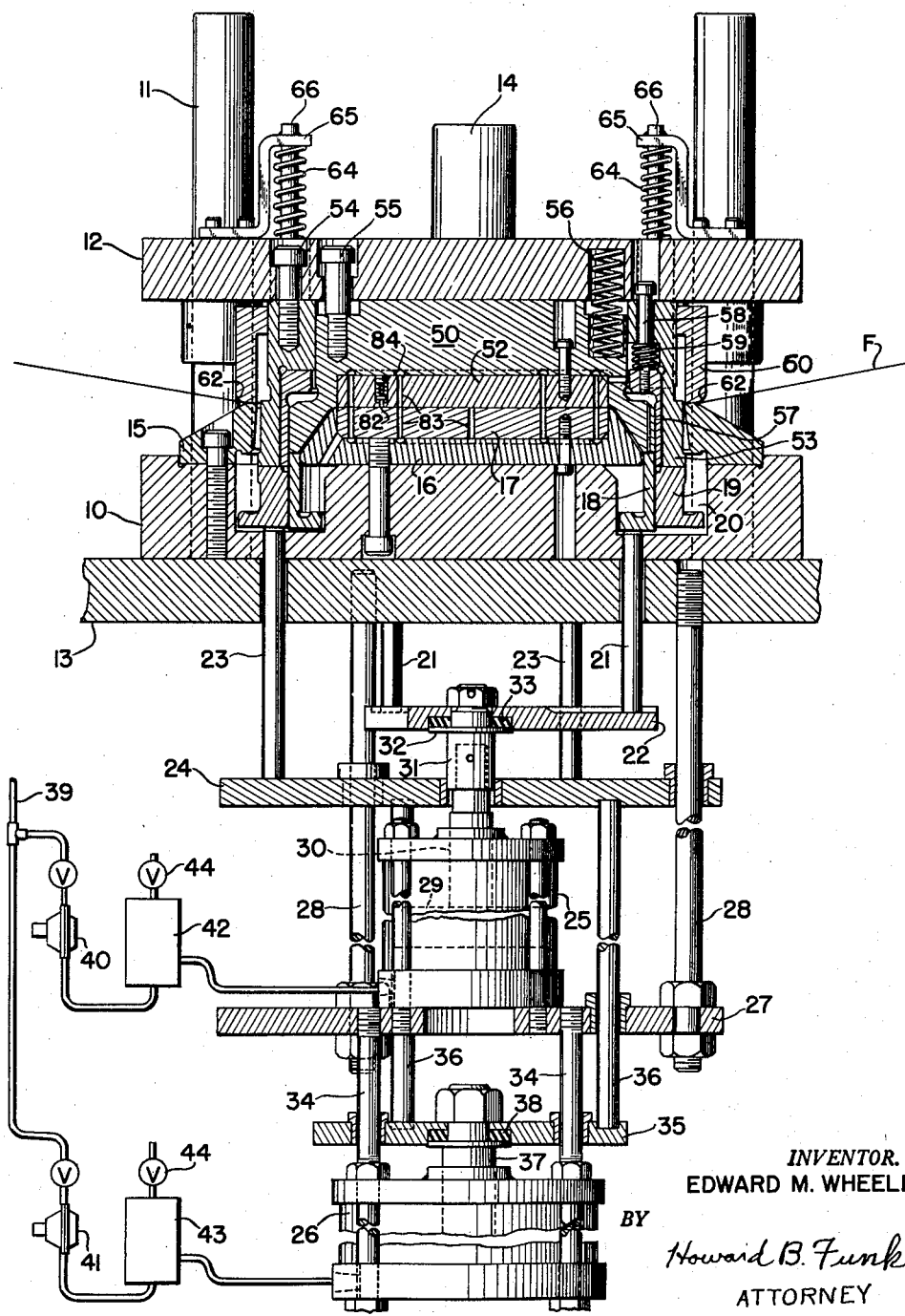

INVENTOR.
EDWARD M. WHEELER
BY
Howard B. Funk
ATTORNEY

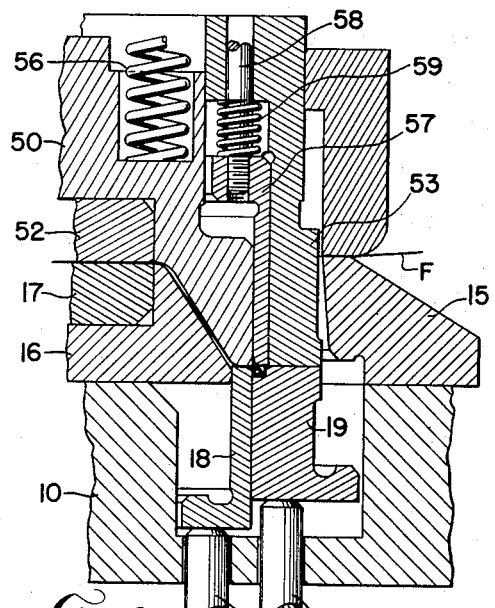
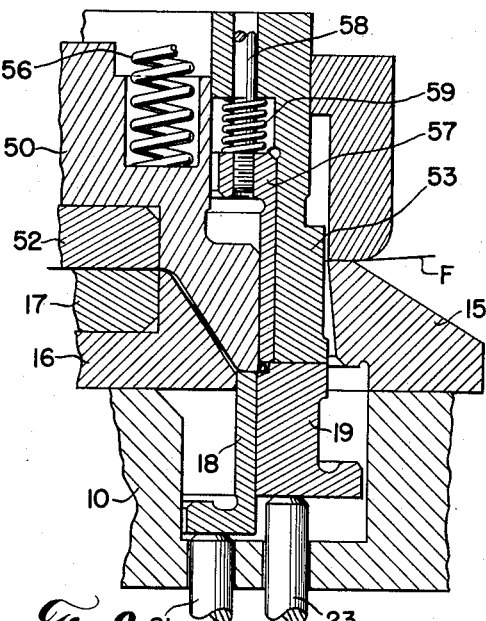
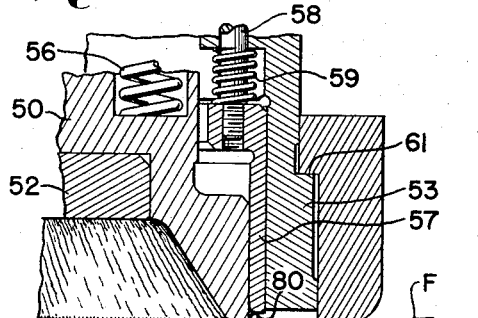
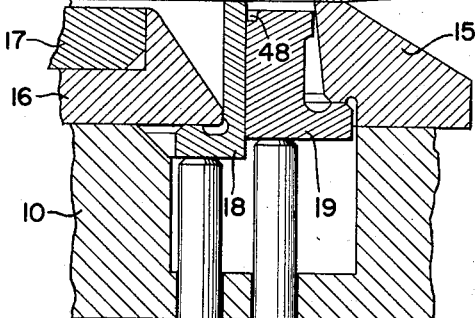
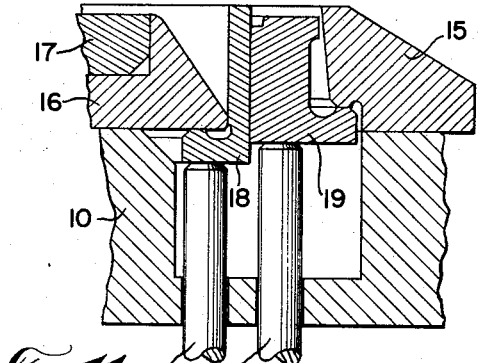
INVENTOR.
EDWARD M. WHEELER
BY
Howard B. Funk
ATTORNEY

United States Patent Office 2,899,922
Patented Aug. 18, 1959

2,899,922

APPARATUS FOR FORMING RECEPTACLES

Edward M. Wheeler, New Kensington, Pa., assignor, by mesne assignments, to Ekco-Alcoa Containers Inc., a corporation of Illinois Application November 3, 1953, Serial No. 389,965

1 Claim. (Cl. 113—42)

This invention relates to an apparatus for making receptacles or pans having a closed bottom, a side wall and a reinforced rim from frangible metal foil, and is more particularly concerned with the production of single use containers such as pie pans and the like.

In the bakery industry, for instance, the baking of pies is carried out with the use of pans which are made from heavy gauge metal so as to be capable of repeated use. Due to their high cost, it is not economically practicable to use them but once and then discard them. In lieu of these repeated use pans, which requires that the baked pies be transferred from them with considerable loss from pie breakage and damage, pan collection and cleaning for reuse and other drawbacks, the bakery industry desires a low cost, one use pan capable of receiving the raw pie ingredients for baking and cooling without deleterious effects and the pie and pan retained together as a unit all the way to the ultimate consumer. A particular requirement in such a one use pan is strength and rigidity to enable it and the pie ingredients in the raw to be rim supported at two diametrically opposite points and handled both before and after baking by existing equipment in the same way as the heavy gauge metal pans are manipulated. While paper plates are known in the art, they have not fulfilled the needs of the trade, primarily because pies cannot satisfactorily be baked in them. Pans formed from metal foil, particularly aluminum foil of a thickness from about .0035" to .007" in its hard temper are desired, but such pans with a pleated rim or with a turned under rim edge have not possessed sufficient strength and rigidity to meet fully the trade requirements and have presented finger cutting hazards. It has been found that foil pans provided with a reinforced rim, as by means of a substantially fully closed rim bead, offers increased strength and rigidity with minimum metal thickness, eliminates the finger cutting hazard and provides a good finished appearance when the bead surface is of smooth, circular form. Heretofore, however, the production of such beaded rim pans has required the use of complicated and expensive production methods and tools for first forming the pan and subsequently forming the rim bead in separate operations and machines which slows production and increases costs.

It is, therefore, an object of the invention to provide an apparatus for producing metal foil receptacles or pans having a closed bottom, a side wall and a rim of any desired width and provided with an upstanding rim flange of uniform height or a substantially fully closed rim bead of smooth, circular form, as may be desired in the finished receptacles or pans, and yet which are easily and rapidly made and are low in cost.

Another object of the invention is to provide a novel apparatus for making fully finished receptacles or pans from hard temper metal foil in a single operation, including the formation of a rim bead of smooth surface condition and regular peripheral form, while using only simple rectilinear motion in the forming operation.

When making rimmed receptacles or pans from hard metal foil, it is not possible to subject the flat blank to sufficient blankholder pressure during the forming operation to avoid wrinkling, since to do so would result in fracturing the foil. Merely reducing the blankholder pressure to avoid fracturing gives insufficient control of wrinkling and some of the wrinkles become higher than others. These high ones will collapse or fold over and result in a multiple thickness of metal. This is to be avoided since it is conducive to the metal tearing and to the formation of ears and an irregular pan edge. Such defects result either in excessive scrap losses or make it practically impossible to form a finish bead on the rim of the pan in a single pan forming operation.

Accordingly, it is another object of the invention to provide a foil pan forming die mechanism which incorporates simple means and arrangement of parts for obtaining effective control of wrinkling and preventing formation of high wrinkles which have a tendency to fold over but, instead, will cause formation of a greater number of small, fine wrinkles to take up the excess metal as the pan is being formed.

A further object is to provide means in a foil pan forming die mechanism for smoothing or ironing out wrinkles from that portion of the rim of the formed pan from which a rim bead is to be formed, so as to bring such portion into condition to enable the bead to be formed.

With the foregoing objects in view, together with others which will become apparent as the description proceeds, the invention comprises the novel combination and arrangement of parts, all as will be described more fully hereinafter, illustrated in the accompanying drawings, wherein a preferred embodiment is shown, and particularly pointed out in the appended claim.

In the drawings:

Fig. 1 is a vertical sectional view through a die mechanism embodying the present invention and illustrates the mechanism in fully closed position; the left half of the section being through the attaching bolts for the top die and punch and the right half of the section being through the pressure springs for the top die and the contiguous ironing and ejector ring.

Fig. 2 is an enlarged fragmental sectional view of the right half of the dies shown in Fig. 1, but illustrates them in open position with the foil strip extending between the top and bottom die elements.

Fig. 3 is a diagrammatic view showing various successive steps in the development or formation of a finished pan.

Figs. 8, 9, 10 and 11 are views similar to Figs. 4 to 7, but illustrating different positions of the parts during the opening movement; Fig. 8 showing their position after having formed a rim bead, Fig. 9 showing their position after bending the rim bead back to complete the pan, Fig. 10 depicting the position of the parts preliminary to release of the pan and Fig. 11 showing them in open position with the pan in released position.

Fig. 12 is an enlarged detail plan view of a portion of a completed pie pan.

Figure 7:
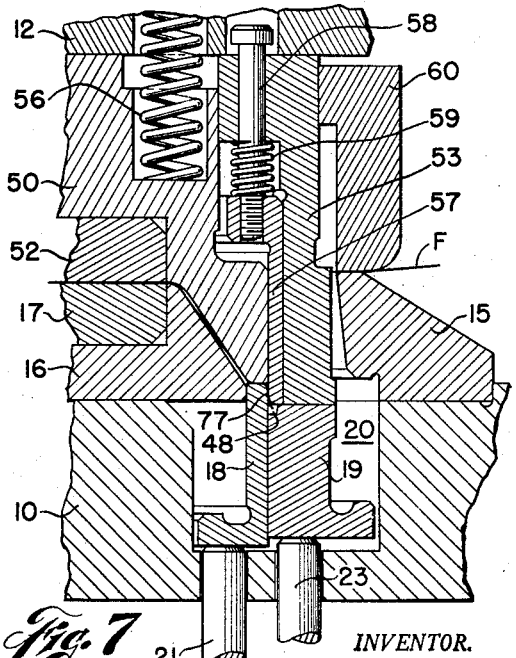
Figure 13:

Fig. 13 is a fragmentary view of parts similar to Fig. 7 but showing a modified form of outer draw ring.

Referring further to the drawings, particularly Figs. 1 and 2, the invention preferably employs a blank die set which comprises a bottom plate 10 of rectangular shape in plan carrying near each corner thereof an upstanding guide post 11 on which is slidably mounted a top plate 12. The die set is mounted on a standard form of single-acting press, the bottom plate 10 being secured on the press bed or bolster plate 13 and the top plate having a usual form of stem 14 which is connected to the press slide in the usual way, so as to be moved down and up with respect to the bottom plate at each press stroke. Since the press forms no part of the novelty of the present invention, only a portion of its bolster plate is shown and further illustration and description thereof are omitted.

Mounted centrally on the bottom plate 10 is an annular cutedge die 15 which is recessed into the top of the plate and secured by a suitable number of bolts, only one being shown. Mounted centrally within the die 15 is a male die or bottom ram 16 which is bolted to the bottom plate. The upper face of the die 16 is defined by a flat central area which blends along an edge radius R (Fig. 2) into a downwardly sloping marginal area that terminates in an outer vertical wall. An engraved die or block 17 is embedded in the top of the die 16, within the radius R, and is suitably engraved on its top face to impart a desired design in the bottom of the pan when it is formed on the male die, as hereinafter described.

The outer vertical wall of the die 16 is spaced from the downwardly relieved inner wall of the cutedge die 15 and an inner draw ring 18 and an outer draw ring 19 fit in and operate vertically within this space. The inner ring slidably engages the vertical wall of the die 16 and the outer ring slidably bears on the inner ring, so that both rings are guided in their vertical movements. Both rings are formed with a bottom flange to engage the underside of the adjacent die in the uppermost position of the draw rings. To accommodate such flanges and the vertical movements of the rings, the bottom plate 10 is provided with an annular channel or recess 20.

The inner draw ring is supported on the upper ends of a plurality of push rods 21 equi-angularly spaced from each other, three such rods usually being employed, which extend vertically down through the bottom of channel 20 and plate 13 and seat in grooves formed in the arms of a three-arm pressure plate 22, as illustrated in Fig. 1. Similarly, a separate set of push rods 23, angularly spaced from rods 21, extend up from a pressure plate 24 and support the outer draw ring 19. The inner and outer draw rings are maintained under different draw pressures by means of separate, adjustable pressure devices or systems which preferably are of the air cushion type, acting independently on the pressure plates 22 and 24, so as to impose substantially uniform pressure on each draw ring in every position thereof. These systems comprise aligned air cylinders 25 and 26 supported by a mounting plate 27 which is rigidly carried on the lower ends of triple hanger rods 28 that extend up through bushings in the plate 24 and are threaded into the bolster plate 13.

The cylinder 25 is bolted on the top of the mounting plate 27 and contains a piston 29 whose piston rod 30 extends up through a bushed bore in the center of plate 24. A piston rod end member 31 is secured to the end of the piston rod 30 and has an annular flange 32 underlying the plate 22, a reduced stem above the flange extending through the center of the plate 22 and carrying a nut by means of which the plate 22 is affixed to the end member 31. The underside of plate 22 is recessed to receive a resilient pad 33 of neoprene or rubber which seats on the flange 32. The pad 33 has a blunt point durometer hardness of about 68-70 and serves as an equalizer member in that it permits slight tilting of the pressure plate 22 on the piston rod end and thereby accommodates for slight inequality in the lengths of the push rods 21.

The lower air cylinder 26 is supported by four hanger rods 34 which extend up through bushed bores in an equalizer plate 35 and are threaded into the mounting plate 27. Triple spacer rods 36 extend up from the equalizer plate 35, through bushed bores in the mounting plate 27, and support the pressure plate 24 at their upper ends. The equalizer plate 35 is mounted on the upper end of piston rod 37 of the air cylinder 26, the connection including a resilient pad 38 which functions like the pad 33.

The pistons of both cylinders 25 and 26 are continuously supported on air supplied from a suitable source, not shown, through a pipe line 39, through pressure regulators 40 and 41 and surge tanks 42 and 43, both individual to the respective cylinders, as shown. Each surge tank is provided with a bleeder valve 44 which is open sufficiently to allow air to escape continuously and thus prevent build-up of air pressure upon depression of the draw rings 18 and 19. As a result, the draw rings are resiliently supported and maintained under substantially constant upward pressure throughout their operating strokes. The upper or rod end of each cylinder 25 and 26 is open to atmosphere by means of suitable outlets or ports, not shown, so that atmospheric pressure condition will prevail in the cylinders above the pistons. While air cushion devices are illustrated for resiliently supporting the draw rings, other types of pressure devices, such as hydraulic devices, may be employed so long as they are adapted to exert substantially constant pressure on the draw rings throughout their operating strokes.

Both draw rings serve to support the marginal portion of a blank during the pan forming operation, but the inner draw ring is supported under less pressure than the outer draw ring. This is accomplished by initial adjustment of the regulators 40 associated with the respective air cylinders 25 and 26. The reason for this difference in pressure is because the outer draw ring is adapted to perform a beading operation, as hereinatfer described, and enough pressure is applied to both rings to provide the desired amount of draw pressure on the foil blank, plus an additional amount on the outer ring to effect the bead forming operation subsequent to the pan-forming operation.

As shown in Fig. 2, the inner draw ring, in its uppermost position, has its top surface flush with the upper plane of the cutedge die 15, while the tops of the male die 16 and outer draw ring 19 are co-planar and spaced slightly below the top plane of the cutedge die. This arrangement assures proper gripping of the superposed foil strip F both outside and inside the cutting edge of die 15 preliminary to the blank cutting operation. It is to be noted, also, that the inner edge of the face of the outer draw ring is provided with a flat-bottom, shallow and continuous recess or half groove 48, for purposes which will be hereinafter explained.

Figure 6:
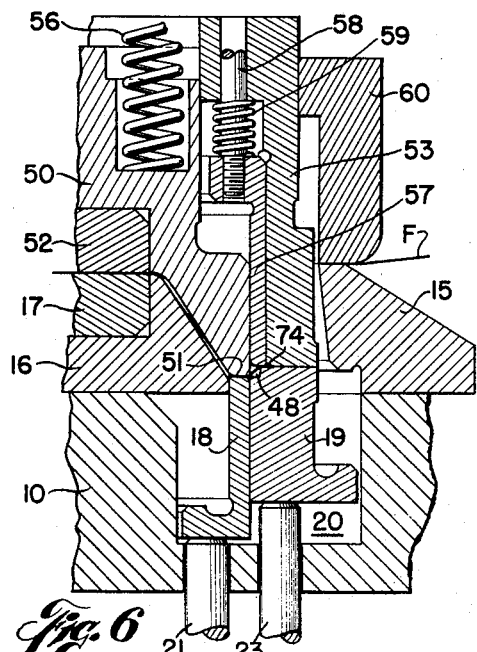

The upper die or punch assembly, which cooperates with the lower one just described, comprises an upper ram or cavity die 50 having a lower portion of the same external dimension as and in alignment with the inner draw ring 18. Its lower face is formed with a recess or cavity for receiving the male die 16 therein and permitting pressure contact between the top of die 16 and the mating bottom of the cavity. The bottom of the cavity blends along a radius S (Fig. 2) into a sloping side wall which blends along a draw edge radius into a flat rim 51 on the bottom of the die 50, which rim cooperates with the inner draw ring 18 to form the rim of a pan. The depth of the cavity corresponds to the depth or vertical height desired for the finished pan. Preferably, the opposed sloping walls of the two dies 16 and 50 are parallel for greater die strength, and are formed to provide a gap or space therebetween in the closed position of the dies, as shown in Figs. 1 and 6 for example. This gap is provided conveniently by making the radius S slightly larger than the radius R, with their centers located equidistantly from the center of the dies. The bottom of the die cavity is counterbored to receive a counterplate 52 with which the engraved block 17 cooperates to impress a desired design in the bottom of the formed pan.

The die 50 is of reduced diameter along its upper end and it is slidably received in a bore formed in the upper end wall of a punch 53 and slidably guided thereby. The punch 53 is rigidly secured to the top plate 12 by a suitable number of angularly spaced bolts 54 (Fig. 1) and it cooperates with the cutting edge of the cutedge die 15 and with the opposed outer draw ring 19. The die 50, also, is supported from plate 12 by means of a suitable number of shouldered bolts 55. It is yieldingly held in a normal position spaced downwardly from plate 12, as shown in Fig. 2, by means of a plurality of springs 56, angularly spaced from bolts 55 and disposed in aligned pockets formed in the die 50 and the plate 12, in which normal position the heads of the bolts 55 engage the plate. This yieldable mounting of die 50 permits relative movement between it and the punch after die 50 is closed upon die 16. The pressure of the springs 56 on the die 50 exceeds the upward pressure of the inner draw ring 18, so that the latter will continuously yield and be depressed during downward movement of the die 50.

Between the die 50 and the punch 53, an ironing and ejector ring 57 is confined for vertical movement relative to both of them. Threaded into the upper thickened end of the ring 57 at spaced intervals around its periphery are a plurality of shouldered bolts 58 which pass upwardly through the overlying upper end wall of the punch 53 and have heads disposed in clearance bores formed in top plate 12. Each bolt 58 is encircled by a spring 59 disposed in a spring receiving pocket formed in the upper end wall of the punch and which acts against the top of the ring 57 to urge the ring downwardly under light spring pressure, the heads of the bolts 58 engaging the top surface of the punch to hold the ring in its normal lower position, as seen in Fig. 2, with vertical clearance or spacing between the punch and the ring.

In their normal positions, both the die 50 and the ring 57 have their lower surfaces flush with each other and are disposed below the bottom surface of the punch 53 by an amount equal to the difference in plane between the inner and outer draw rings 18 and 19. The width of the ring 57 is greater than the width of the notch 48 so as to span the same and bear on the top of the outer draw ring 19. This is to assure imposition of holding pressure over the entire marginal area of the interposed foil blank during the pan forming operation, except for the area extending across the notch 48.

A combined hold-down and stripper member 60 is mounted on the outer side of the punch 53 for vertical movement relative thereto. Normally, the punch and the stripper have shouldered engagement with each other, as indicated at 61 (Fig. 2), in which position the lower face of the stripper is co-planar with the bottom faces of the ring 57 and the die 50. This assures that the foil strip F will be depressed, during closing movement of the die set or mechanism, and holding pressure imposed thereon both inside and outside the cutting edge of the cutedge die before the punch performs the blank cutting operation. The leading and trailing sides of the stripper 60, in the direction of travel of the foil strip F past the die mechanism, are rounded, as shown at 62, in order to prevent possibility of cutting the strip as it is being depressed from its normal pass or feed line (Fig. 2) into position on the lower die assembly. To provide adequate hold-down pressure on the foil strip, the member 60 is of square shape in plan and near each corner is provided with a blind hold 63 in which a vertical spring 64 is seated. The spring extends up through a clearance bore in top plate 12 and bears up against the under face of a bracket 65 which is secured to the top of the plate 12. The bracket carries a rod 66 which the spring encircles, whereby the spring is supported against lateral collapse. The rod ends well above the bottom of the hole 63 so as to permit the required length of relative motion between the punch and the stripper.

The step-by-step operation of the die mechanism is illustrated in Figs. 4 through 11 and various stages in the formation of a finished pan is illustrated in Fig. 3, devoid of apparatus for clarity. Before describing the operation, it may be pointed out that the foil strip F may be taken from a supply roll or coil positioned at one side of the press and successive lengths thereof drawn past the die mechanism by feed rolls located at the other side of the press and actuated in timed relation to each press stroke, the strip feed terminating as the upper die assembly approaches the lower die assembly, all as is well known in the art.

Figure 4:
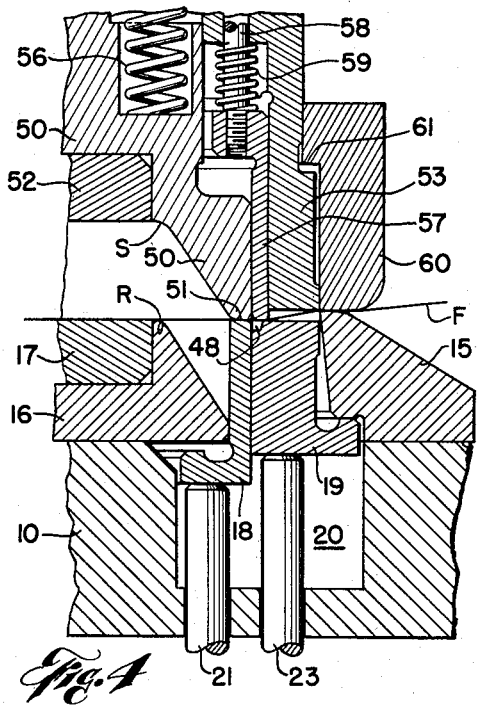
Figs. 4, 5, 6 and 7 are enlarged fragmentary views of a portion of the right half of the dies shown in Fig. 1, these views showing different closing positions of the parts beginning with cutting a circular blank from the interposed foil strip, for the formation of a circular pan, and ending with the parts in fully closed position.

Assuming the upper die mechanism to be descending, the various elements thereof will be positioned as illustrated in Fig. 2. The interposed foil strip F will be engaged by the upper die parts 51, 57 and 60 and depressed into contact with the inner draw ring 18 and cutedge die 15. The punch 53, due to its retracted relation to the adjacent die parts 57 and 60, has not yet engaged the foil, so during further downward movement to make the contact, the rim 51 of the top die 50 further depresses the foil and the inner draw ring 18 to the level of the male die 16 and the outer draw ring 19, the ring 57 also moving down to this level, to establish a firm grip upon the foil inside the cutting edge of the die 15. At this time, the hold-down 60 is clamping the foil against the top of the cutedge die 15 outside the cutting edge thereof. While it is thus securely held, as shown in Fig. 4, the punch cooperates with the cutedge die 15 and cuts out a blank 70, Fig. 3, from the strip F.

Figure 5:
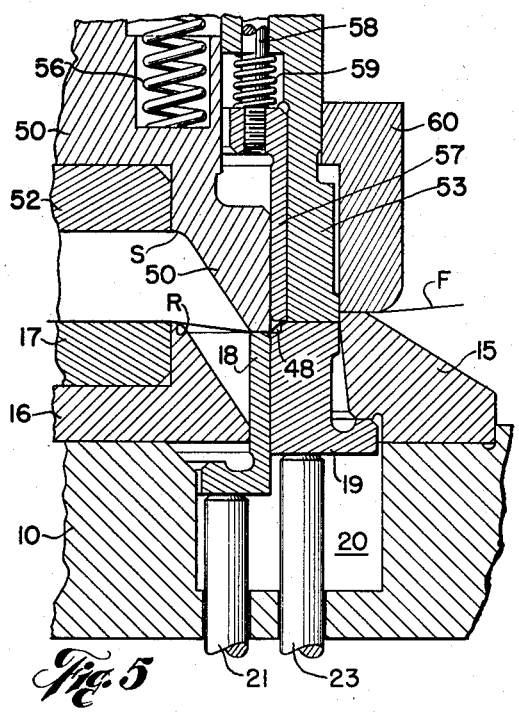

As the dies undergo further closing movement, the inner draw ring 18 recedes into channel 20 under the pressure of top die 50 and punch 53 presses the outer edge portion of the blank down against the outer draw ring 19. The parts are now in the position shown in Fig. 5, with the blank turned down slightly over the radius R of the male die and draw tension established between die 50 and draw ring 18 at the lower level of the notch 48, and between punch 53 and draw ring 19 at the upper level of the notch. At the notch, the foil extends diagonally across between the upper and lower edges thereof. The upper ring 57, it will be seen, has been lifted into coincidence with the punch bottom level and into contact at its upper end with the upper end wall of the punch, as shown in Figs. 1 and 5. The blank now has the shape shown at A in Fig. 3.

The parts gripping the marginal or rim portion of the blank remain in this relation to each other during movement thereof from the position shown in Fig. 5 to that shown in Fig. 6, where the two dies 16 and 50 are fully closed upon each other, with their sloping walls in spaced relation. During this stage of closing movement, part of the rim portion of the blank is steadily withdrawn from between the gripping elements and the blank is drawn down around the male die radius R and across the gap and around the draw radius on the inner side of the die rim 51, thereby forming a pan having a flat bottom 71, a sloping side wall 72 and a horizontal rim 73, as shown at B in Fig. 3. By reason of the gap provided between the opposed sloping wall portions of the dies 16 and 50, there is no vertical pressure applied to the side wall 72 of the pan. The blank 70 still has an outer edge portion 74 (Figs. 3 and 6) gripped between the punch and outer draw ring.

During this formative stage of the pan, wrinkles form in the blank to take up the excess metal which is present by reason of the fact that the original area of the blank is being brought into a smaller area. The wrinkles start in the blank outside the radius R of the male die 16 and extend radially to the outer edge of the blank, since the draw pressure exerted on the blank must be correlated to the strength of the foil to avoid fracturing and hence is insufficient to avoid wrinkling, as heretofore pointed out.

In Fig. 6 and the subsequent ones, no attempt has been made to show the wrinkles, but they are present in the pressure zone and they effect depression of the draw rings. Some of the wrinkles, if uncontrolled, will usually become higher than others and will collapse or fold over under the applied draw pressure and result in pleats or multiple thickness of metal at points around the circumference of the pan and the formation of ears and an irregular pan edge. In addition, where the draw pressure is allowed to increase, the danger of tearing or rupturing the foil is greatly increased. Herein, this danger of tearing is substantially eliminated by applying substantially constant pressure to the draw rings in all positions thereof and control of the wrinkle formation is effected by the provision of additional draw edges at the upper and lower edges of the notch 48. The provision of this notch makes the lower outer edge of the rim 51 of die 50 a draw edge and the upper outer edge of the notch another draw edge, both located within the gripping or pressure zone on the foil blank. The staggered planes of the draw rings, together with the notch, impart reverse bends to the foil blank rim, as clearly shown in Figs. 3, 5 and 6. With this structure and arrangement, the metal, as it goes over these additional draw edges, is supported by the upper ring 57 and the lower ring 18 opposite the respective draw edges and is caused to break into a multiplicity of short, shallow wrinkles 75 in the rim of the pan, as shown in Fig. 12, the formation of which causes the longer, principal wrinkles 76 to remain quite shallow, since the excess metal is taken up by the formation of an increased number of finer and shallower wrinkles rather than by wrinkle height. The intermediate wrinkles 75 extend smoothly down into the side wall of the pan, as shown in Fig. 12, while the main wrinkles 76 taper from near the bottom of the pan and blend smoothly into the pan rim as shown at B in Fig. 3. In consequence, formation of pleats is avoided and the side wall 72 and rim 73 of the pan are greatly strengthened.

Since the dies 16 and 50 are now fully closed, the punch 53 and the ring 57 move down, relatively thereto, to the bottom of the press stroke, which is the position shown in Figs. 1 and 7. In this position, the top of the die 50 is engaged against the top plate 12, the engraved block 17 and counter 52 have impressed their design in the bottom of the pan and a clearance has developed between the heads of the bolts 55 and the plate 12, as seen in Fig. 1. During this final stage of die closing movement, the outer edge portion 74 of the blank is steadily withdrawn from between the punch 53 and ring 57 and the outer draw ring 19 and is drawn along the outer side of the inner draw ring 18 into a vertical flange 77 with an outward flare 78 left on its lower edge, as shown at C in Fig. 3. Radially, clearance slightly greater than the average thickness of the foil is provided between the opposed surfaces of the rings 18 and 57, so as to accommodate the foil therebetween and prevent shearing or tearing of the foil when the ends of the rings move past each other. The ring 57, as it moves down along the side of the ring 18 to form the flange 77, serves to press the foil against the outer side of the ring 18 and iron or smooth out the wrinkles therein, thereby bringing the surface of the flange into a smooth, substantially wrinkle-free condition. This conditioning of the flange is conducive to curling the flange into a rim bead, when such a bead is to be formed. The outward flare 78 is formed by reason of the draw radius provided on the lower inner edge of the ring 57 and the fact that the die closing movement is terminated with the end of ring 57 slightly above the end of the flange 77.

The die opening or upstroke of the press now begins. If a container or pan with a flange upstanding from its rim is to be the finished product, as may be desired, the depth of the notch is as shown at 48a (Fig. 13), so that its bottom will not engage the edge of the flange, whereby the dies merely move to open position and the pan is ejected therefrom by an air blast or other suitable manner. In order to provide the pan with a closed rim bead, as is specifically desired for a pie pan and the like, a shallow notch 48, as shown in the other drawings, is provided. During opening movement of the dies from the position shown in Fig. 7 to that shown in Fig. 8, the springs 56 hold the top die 50, the draw ring 18 and the confined pan against upward movement. The punch 53 is positively raised with the upwardly moving top plate 12 and the outer draw ring 19 follows under the upward thrust of its push rods 23 and maintains the ring 57 up in contact with the end wall of the punch. The flat bottom wall of the notch 48 in the draw ring 19 contacts the flared end of the flange and exerts vertical pressure thereon and the flange rolls or curls outwardly and back into a substantially fully closed bead 80, as shown at D in Fig. 3. To render this curling operation successful, it has been found necessary to support the flange against inward collapse, which the ring 18 provides, and to make the width and depth of the notch greater than the diameter of the bead which forms, so as to allow the flange to curl up in a natural curve without restriction, or frictional contact with the side wall of the notch and the bottom of ring 57.

The bead 80 now needs to be bent back so that it will be disposed at the upper side of the rim 73 of the inverted pan, as shown at E in Fig. 3, and, hence, will be at the underside of the rim of an upright pan after its removal from the dies. This is accomplished by further upward movement of the punch 53, ring 57 and the draw ring 19, with respect to the still immobile top die 50, from the position shown in Fig. 8 to that shown in Fig. 9.

It is in this latter position that the heads of the supporting bolts 55 for the die 50 reengage the top plate 12 and, in consequence, the top die 50 is lifted or moved up in unison with the punch. This allows the inner draw ring 18 to rise under the upward thrust of its push rods 21. Thereby, the finished pan is lifted from the bottom die 16 and the die elements move up to the position shown in Fig. 10. Just before reaching this position, the outer draw ring 19 comes to rest by engagement of its flange with the cutedge die 15 and the bead 80 is subjected to the light downward pressure of the ring 57 as the bead is moved out of the notch 48. The shouldered engagement 61 between the punch and the stripper member 60 is also reestablished when the dies reach the position shown in Fig. 10.

The top die assembly continues to move upwardly and the pan needs to be released from the cavity of the top die 50. This is accomplished by means of a suitable number of conventional spring-pressed ejector pins 82, only one of which is shown in Fig. 1, carried by the counterplate 52. As the top die moves away from the inner draw ring 18 to an upper position, the ejector pins act on the bottom of the pan and the ring 57 acts on the bead 80 and effect release of the pan from the upper die, as shown in Fig. 11. Then when the upper die assembly becomes sufficiently open, the pan may be laterally ejected from the dies by an air blast or in any other well known way.

In order to prevent collapse of the bottom of the pan when it is lifted from the male die 16 and also to facilitate its release from the top die 50, both dies are vented by means of vertical ducts 83 and annulas air passages 84 which communicate through suitable ports to the atmosphere exteriorly of the dies, as shown in Fig. 1.

Having now fully described the invention and indicated a preferred manner of constructing and using the same, it will be apparent that various changes in the details of the embodiment of the invention illustrated and described hereinabove may be made by those skilled in the art without departing from the spirit and scope of the invention as defined in the appended claim.

What is claimed is:

In apparatus for forming pans and the like from frangible metal foil, co-axial male and cavity dies movable into closed position to form a bottom and sloping side wall of a pan from an interposed foil disc blank, said cavity die having a flat rim surrounding its cavity for forming a pan rim with its edge lift projecting, a punch encircling said cavity die and cooperating with an opposed cutedge die to cut said blank from a foil strip, depressible inner and outer draw rings opposed to and coactive with said die rim and said punch, respectively, for placing contiguous marginal areas of the blank under draw tension insufficient to prevent wrinkle formation in said side wall and pan rim during the die closing movement, the outer draw ring having a notch formed in the inner edge of its face, means yieldingly holding said cavity die within said punch in projecting relation thereto, whereby said draw rings are moved thereby into offset planes and the foil blank bent diagonally across said notch to control the wrinkle formation during the die closing movement, said punch being movable forwardly relative to said cavity die past said closed die position, a ring internal of and movable with said punch and having radial clearance with respect to said inner draw ring by an amount slightly greater than the average thickness of the foil for drawing said rim edge along the outer side of said inner draw ring and smoothing out the wrinkles therein to form a rim flange with its free edge flared outwardly, said notch having a flat bottom to roll said flange back into a substantially fully closed rim bead and bend the same into position beyond the plane of said pan rim during initial retractive movement of said punch, the area of said notch being greater than the diameter of said bead, and bolt and spring elements associated with said internal ring to normally yieldingly hold the same in projecting relation to said punch, whereby the ring serves as an ejector to exert outward pressure on said bead and assist in releasing the completd pan from said cavity die during die opening movement.

References Cited in the file of this patent

UNITED STATES PATENTS

| | | |
|---|---|---|
| 535,472 | Troyer | Mar. 12, 1895 |
| 1,029,333 | Adriance et al. | June 11, 1912 |
| 1,575,300 | Weeks et al. | Mar. 2, 1926 |
| 1,884,708 | Jeneson | Oct. 25, 1932 |
| 1,974,981 | Carvalho | Sept. 25, 1934 |
| 2,040,731 | Ernst | May 12, 1936 |
| 2,136,308 | Miller | Nov. 8, 1938 |
| 2,312,749 | Bollock | Mar. 2, 1943 |
| 2,331,491 | Menkin | Oct. 12, 1943 |
| 2,434,375 | Van Saun | Jan. 13, 1948 |
| 2,591,108 | Vigneault et al. | Apr. 1, 1952 |
| 2,331,491 | Menkin | Oct. 12, 1953 |